United States Patent
Vrabete (10) Patent No.: US 9,740,951 B2
(45) Date of Patent: Aug. 22, 2017

(54) TECHNOLOGIES FOR OBJECT RECOGNITION FOR INTERNET-OF-THINGS EDGE DEVICES

(71) Applicant: Intel Corporation, Santa Clara, CA (US)

(72) Inventor: Bradut Vrabete, Sixmilebridge (IE)

(73) Assignee: Intel Corporation, Santa Clara, CA (US)

( * ) Notice: Subject to any disclaimer, the term of this patent is extended or adjusted under 35 U.S.C. 154(b) by 34 days.

(21) Appl. No.: 14/851,094

(22) Filed: Sep. 11, 2015

(65) Prior Publication Data

US 2017/0076168 A1   Mar. 16, 2017

(51) Int. Cl.
   *G06K 9/00* (2006.01)
   *G06K 9/32* (2006.01)
   *G06F 17/30* (2006.01)

(52) U.S. Cl.
   CPC ....... *G06K 9/3241* (2013.01); *G06F 17/3028* (2013.01); *G06F 17/30247* (2013.01); *G06K 9/00624* (2013.01)

(58) Field of Classification Search
   USPC ........................................ 382/103
   See application file for complete search history.

(56) References Cited

PUBLICATIONS

Camgian Microsystems, 2015 p. 41, retrieved from internet retrieved on Apr. 2, 2017 from URL: <http://www.iposi.com/images/pdf/Hot_Tech_Innovators_Whitepaper_oEgWJBN.pdf>.*

* cited by examiner

*Primary Examiner* — Gregory F Cunningham
(74) *Attorney, Agent, or Firm* — Barnes & Thornburg LLP (57) ABSTRACT

Technologies for edge device object recognition include a server and one or more edge devices in communication over a network. The server maintains an object recognition database that stores images associated with a plurality of objects. The server identifies a subset of the objects that is expected to be recognized by each of the edge devices and generates a reduced object recognition database for each edge device that includes the corresponding subset of images. Each edge device monitors for device events and, in response to a device event, performs object recognition using the corresponding reduced object recognition database. The edge device may transmit thumbnail images of unrecognized objects to the server. The edge device may be coupled to a product storage device such as a cooler or retail shelf, and device events may include sensor events such as door open or door closed events. Other embodiments are described and claimed.

19 Claims, 4 Drawing Sheets

FIG. 4

TECHNOLOGIES FOR OBJECT RECOGNITION FOR INTERNET-OF-THINGS EDGE DEVICES

BACKGROUND

Many types of devices, such as sensors, vehicles, appliances, industrial equipment, and other things, are gaining computing resources and network capability. Sometimes described as the Internet of Things (IoT), modern computing systems may include cloud-based servers, network infrastructure, and connected edge devices that all work together to perform networked application functions. Typical IoT connected edge devices may be small devices with low power consumption and thus typically include relatively low processing power or other computing resources. Additionally, typical IoT connected devices at the edges of the network may have limited available bandwidth. Establishing a high-speed network connection for IoT connected devices may require an expensive data plan or other network service.

Certain computing devices may recognize one or more objects based on input images. Typical object recognition algorithms require large reference image databases in order to perform object recognition. Execution time of object recognition algorithms is typically proportional to the image database size.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
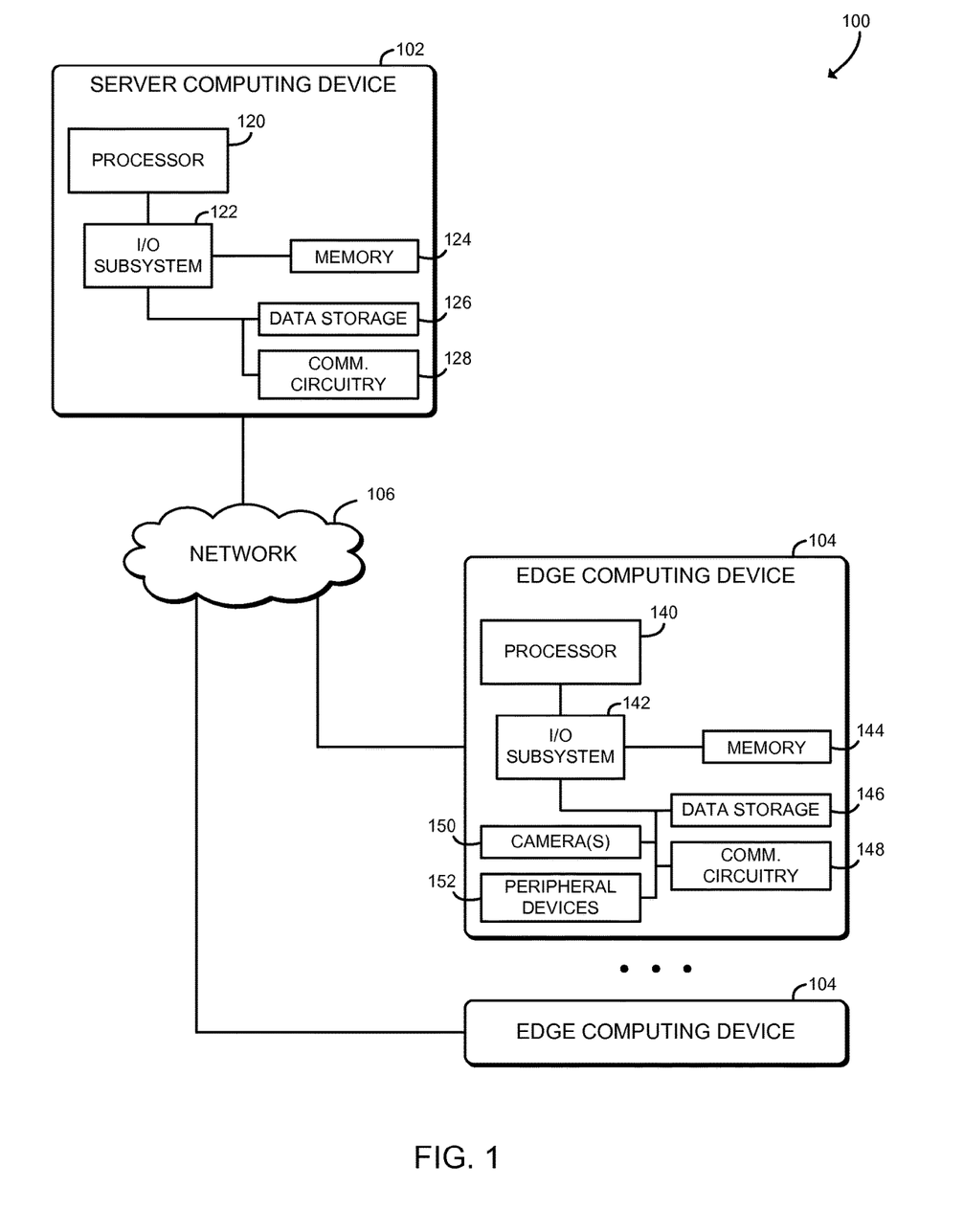
FIG. 1 is a simplified block diagram of at least one embodiment of a system for edge device object recognition.

Referring now to FIG. 1, in an illustrative embodiment, a system 100 for object recognition for Internet-of-Things (IoT) edge devices includes a server computing device 102 and multiple edge computing devices 104 in communication over a network 106. The edge computing devices 104 may be embodied as connected devices, IoT gateways, embedded devices, or other devices with limited computing resources and/or limited available power. For example, in an illustrative embodiment, the edge computing devices 104 may be included in or coupled with product storage units such as retail display units, retail shelves, vending machines, or coolers. In use, as described in more detail below, the server computing device 102 maintains a database including image data associated with numerous objects that may be recognized, such as products or product packaging. The image data may be generated from three-dimensional models of the objects, if available. For each edge computing device 104, the server computing device 102 generates a reduced database including data relating only to objects expected to be recognized by that particular edge computing device 104. The server computing device 102 provides the reduced databases to the edge computing devices 104. The edge computing devices 104 monitor for device events and perform object recognition using the reduced databases in response to the device events. If an object is not recognized, an edge computing device 104 may transmit a thumbnail of the unrecognized object to the server computing device 102, which may reply with object recognition data for that object. Thus, by reducing the size of the object recognition database for each edge computing device 104, the system 100 may reduce the processing and/or power requirements for each edge computing device 104. By performing object recognition only in response to device events, the system 100 may further reduce performance and/or power requirements for each edge computing device 104. Additionally, by generating recognition data from three-dimensional models, the system 100 may reduce the manual effort required to prepare the object recognition database.

The server computing device 102 may be embodied as any type of computation or computer device capable of performing the functions described herein, including, without limitation, a computer, a server, a rack-mounted computing device, a desktop computer, a workstation, a laptop computer, a notebook computer, a tablet computer, a mobile computing device, a wearable computing device, a network appliance, a web appliance, a distributed computing system, a processor-based system, and/or a consumer electronic device. As shown in FIG. 1, the server computing device 102 illustratively includes a processor 120, an input/output subsystem 122, a memory 124, a data storage device 126, and communication circuitry 128. Of course, the server computing device 102 may include other or additional components, such as those commonly found in a server (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments. Additionally or alternatively, in some embodiments, the server computing device 102 may be embodied as a "virtual server" formed from multiple computing devices distributed across the network 106 and operating in a public or private cloud. Accordingly, although the server computing device 102 is illustrated in FIG. 1 as embodied as a single server device, it should be appreciated that the server computing device 102 may be embodied as multiple devices cooperating together to facilitate the functionality described below.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the server computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the server computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processors 120, the memory 124, and other components of the server computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. As described further below, the data storage device 126 may store and/or maintain an object recognition database used for object recognition.

The communication circuitry 128 of the server computing device 102 may be embodied as any communication circuit, device, or collection thereof, capable of enabling communications between the server computing device 102, the edge computing devices 104, and/or other remote devices over the network 106. The communication circuitry 128 may be configured to use any one or more communication technology (e.g., wired or wireless communications) and associated protocols (e.g., Ethernet, Bluetooth®, Wi-Fi®, WiMAX, etc.) to effect such communication.

Each of the edge computing devices 104 may be embodied as any type of computation or computer device capable of performing the functions described herein, including, without limitation, a connected device, an embedded device, an Internet of Things (IoT) gateway, a smartphone, a mobile audio or video player, a computer, a desktop computer, a workstation, a laptop computer, a notebook computer, a tablet computer, a wearable computing device, a network appliance, a web appliance, a distributed computing system, a processor-based system, and/or a consumer electronic device. The edge computing device 104 may include components and devices commonly found in an embedded device or similar computing device, such as a processor 140, an I/O subsystem 142, a memory 144, a data storage device 146, communication circuitry 148, and/or other devices. Those individual components of the edge computing device 104 may be similar to the corresponding components of the server computing device 102, the description of which is applicable to the corresponding components of the edge computing device 104 and is not repeated herein so as not to obscure the present disclosure.

The edge computing device 104 may also include one or more cameras 150 and one or more peripheral devices 152. The camera 150 may be embodied as a digital camera or other digital imaging device integrated with the edge computing device 104 or otherwise communicatively coupled thereto. The camera 150 includes an electronic image sensor, such as an active-pixel sensor (APS), e.g., a complementary metal-oxide-semiconductor (CMOS) sensor, or a charge-coupled device (CCD). The camera 150 may be used to capture images of the environment of the edge computing device 104 including, in some embodiments, capturing still images or video images. In some embodiments, the camera 150 may embodied as one or more three-dimensional cameras, stereo vision cameras, three-dimensional scanners, or other sensors capable of capturing the two-dimensional or three-dimensional shape of objects in the environment of the edge computing device 104.

The peripheral devices 152 may include any number of additional input/output devices, interface devices, and/or other peripheral devices. In some embodiments, the peripheral devices 152 may include one or more sensors. For example, in some embodiments the edge computing device 104 may be incorporated in or otherwise coupled to a product storage unit such as a retail display unit, a retail shelf, a vending machine, a cooler, a display case, a warehouse shelf, or other storage unit for storing retail products or other objects. In those embodiments, the peripheral devices 152 may include door opening sensors, weight sensors, light sensors, or other sensors that may be used to determine when a user has opened or otherwise accessed the retail display unit.

As discussed in more detail below, the server computing device 102 and the edge computing devices 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), a cellular network, and/or a publicly-accessible, global network such as the Internet. As such, the network 106 may include any number of additional devices, such as additional computers, routers, and switches, to facilitate communications among the devices of the system 100.

Figure 2:
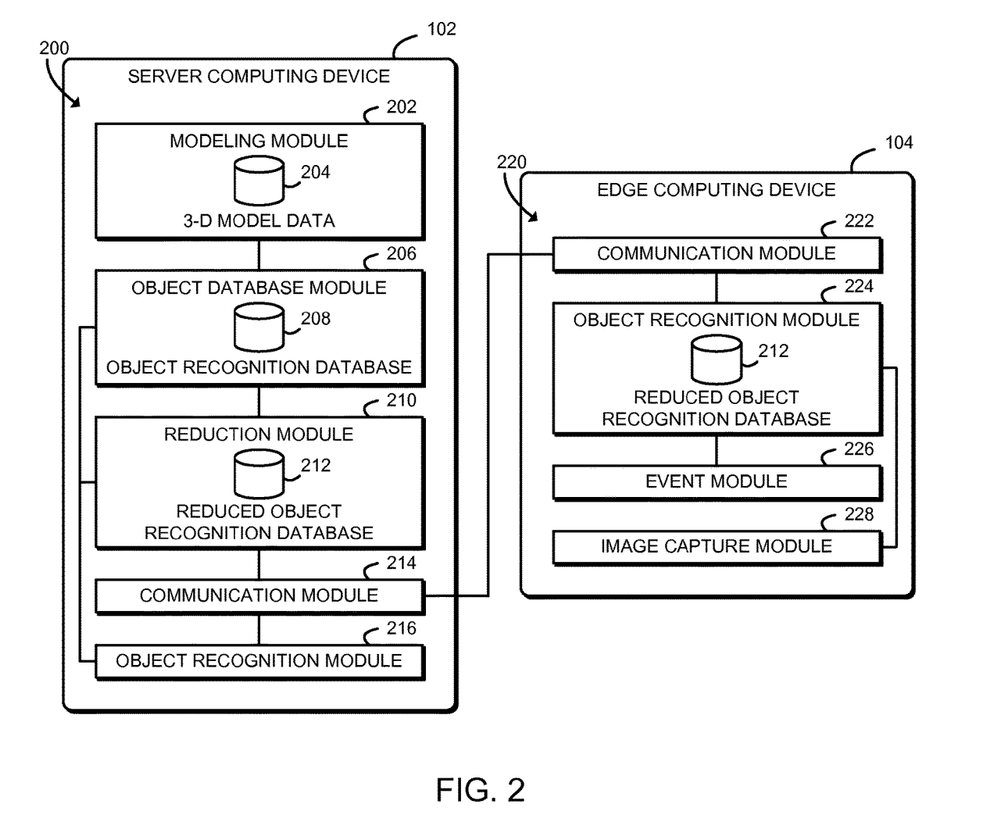
FIG. 2 is a simplified block diagram of at least one embodiment of various environments that may be established by the system of FIG. 1.

Referring now to FIG. 2, in an illustrative embodiment, the server computing device 102 establishes an environment 200 during operation. The illustrative environment 200 includes a modeling module 202, an object database module 206, a reduction module 210, a communication module 214, and an object recognition module 216. The various modules of the environment 200 may be embodied as hardware, firmware, software, or a combination thereof. For example the various modules, logic, and other components of the environment 200 may form a portion of, or otherwise be established by, the processor 120 or other hardware components of the server computing device 102. As such, in some embodiments, any one or more of the modules of the environment 200 may be embodied as a circuit or collection of electrical devices (e.g., modeling circuitry 202, object database circuitry 206, reduction circuitry 210, etc.).

In some embodiments, the modeling module 202 is configured to convert a three-dimensional model of an object into a plurality of two-dimensional images associated with the object. The modeling module 202 may manage or otherwise access three-dimensional model data 204, which may include three-dimensional model data for various objects.

The object database module 206 is configured to manage or otherwise access an object recognition database 208. The object recognition database 208 includes two-dimensional images associated with a plurality of objects. As described further below, the two-dimensional images may be used by the edge computing devices 104 and/or the server computing device 102 to recognize objects from captured image data. In some embodiments, the object database module 206 may be configured to add the two-dimensional images associated with the object produced by the modeling module 202 to the object recognition database 208. Additionally or alternatively, in some embodiments, the object recognition database 208 may include three-dimensional images, three-dimensional models, or other three-dimensional data that may be used by the edge computing devices 104 and/or the server computing device 102 to recognized objects.

The reduction module 210 is configured to identify a subset of the plurality of objects of the object recognition database 208 for each of the edge computing devices 104, based on an identity of the corresponding edge computing device 104. Each object of the identified subset of objects is expected to be captured in an image by the corresponding edge computing device 104. The reduction module 210 is further configured to generate a reduced object recognition database 212 for each edge computing device 104 based on the object recognition database 208. The reduced object recognition database 212 includes two-dimensional images associated with the identified subset of objects. The reduction module 210 may be configured to identify the subset of objects based on, for example, an expected location and/or expected use of the corresponding edge computing device 104.

The communication module 214 is configured to transmit a reduced object recognition database 212 to each of the edge computing devices 104. In some embodiments, the communication module 214 may be configured to receive a thumbnail image from an edge computing device 104 and transmit an updated reduced object recognition database 212 to the edge computing device 104 in response to receiving the thumbnail image.

In some embodiments, the object recognition module 216 is configured to identify an object based on the thumbnail image received from the edge computing device 104 using the object recognition database 208. The reduction module 210 may be further configured to add two-dimensional images associated with the recognized object to an updated reduced object recognition database 212 in response to identifying the object based on the thumbnail image.

Still referring to FIG. 2, in the illustrative embodiment, an edge computing device 104 establishes an environment 220 during operation. The illustrative environment 220 includes a communication module 222, an object recognition module 224, an event module 226, and an image capture module 228. The various modules of the environment 220 may be embodied as hardware, firmware, software, or a combination thereof. For example the various modules, logic, and other components of the environment 220 may form a portion of, or otherwise be established by, the processor 140 or other hardware components of the edge computing device 104. As such, in some embodiments, any one or more of the modules of the environment 220 may be embodied as a circuit or collection of electrical devices (e.g., communication circuitry 222, object recognition circuitry 224, event circuitry 226, etc.).

The communication module 222 is configured to receive a reduced object recognition database 212 from the server computing device 102. As described above, the reduced object recognition database 212 includes two-dimensional images associated with a plurality of objects. Additionally or alternatively, and similar to the object recognition database 208, in some embodiments the reduced object recognition database 212 may include three-dimensional images, three-dimensional models, or other three-dimensional data that may be used by the edge computing device 104 to recognized objects. In some embodiments, the communication module 222 may be further configured to transmit a thumbnail image of an unrecognized object to the server computing device 102 and to receive in response an updated reduced object recognition database 212 from the server computing device 102. The updated reduced object recognition database 212 includes two-dimensional images associated with the unrecognized object.

The event module 226 is configured to monitor for occurrences of device events. The event module 226 may be configured to monitor for device events by receiving sensor data from one or more sensors of the edge computing device 104. Device events may include, for example, door open events and/or door close events. The image capture module 228 is configured to capture image data from the camera 150 of the edge computing device 104. The image capture module 228 may capture the image data, for example, in response to an occurrence of the device event.

The object recognition module 224 is configured to perform object recognition in response to the occurrence of the device event. The object recognition module 224 is configured to perform object recognition based on the image data captured from the camera 150, using the reduced object recognition database 212. In some embodiments, the object recognition module 224 may be configured to generate a weighted recognition value based on the image data. The object recognition module 224 is further configured to perform an object recognition action such as logging the results of the object recognition in response to performing the object recognition. In some embodiments, the object recognition module 224 is configured to determine whether an object is recognized in response to performing the object recognition and, if the object is not recognized, generate a thumbnail image of an unrecognized object.

Figure 3:
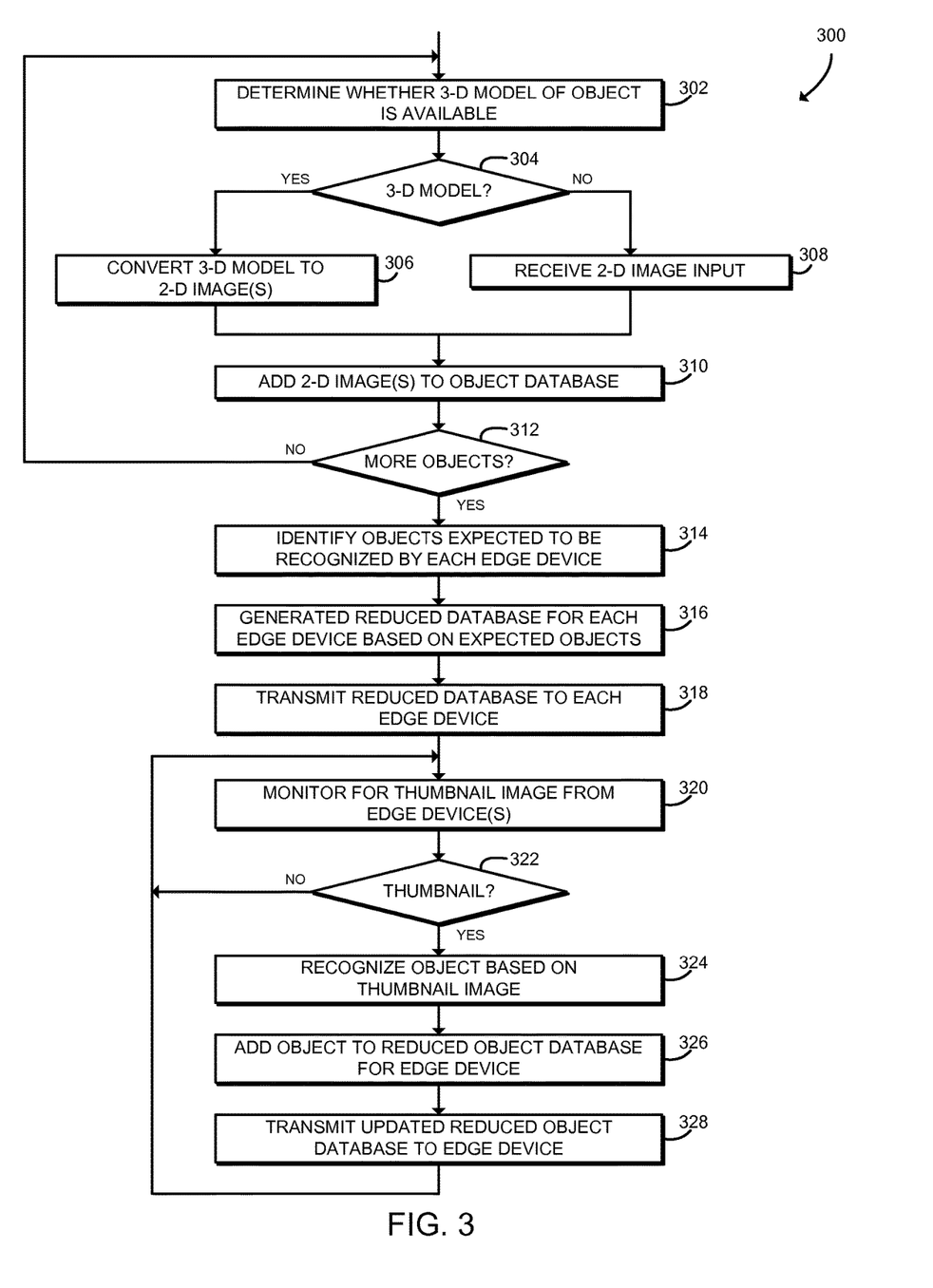
FIG. 3 is a simplified flow diagram of at least one embodiment of a method for edge device object recognition that may be executed by a server computing device of FIGS. 1 and 2.

Referring now to FIG. 3, in use, the server computing device 102 may execute a method 300 for edge device object recognition. The method 300 begins with block 302, in which the server computing device 102 determines whether a three-dimensional model of a particular object to be added to the object recognition database 208 is available in the 3-D model data 204. For example, many consumer products and/or the packaging for those consumer products may be originally designed using computerized design tools (e.g., computer-aided design software, publishing or layout software, image editing software, or other software productivity tools). Therefore, 3-D model data 204 may exist for many objects such as consumer products or product packaging that may be expected to be recognized by the edge computing devices 104. In block 304, the server computing device 102 checks whether the three-dimensional model data is available. If the three-dimensional model data is not available, the method 300 branches to block 308, described below. If three-dimensional model data is available, the method 300 branches to block 306.

In block 306, the server computing device 102 converts the three-dimensional model to one or more two-dimensional images of the object. For example, the server computing device 102 may render the three-dimensional model from several viewpoints to generate the two-dimensional images. The server computing device 102 may render the two-dimensional images using idealized lighting or otherwise render two-dimensional images that are suitable for using to perform object recognition. After rendering the two-dimensional image, the method 300 proceeds to block 310, described below.

Referring back to block 304, if no three-dimensional model data is available for the object, the method 300 branches to block 308, in which the server computing device 102 receives two-dimensional image data input for the product. For example, the two-dimensional images may be provided by a user or otherwise manually designated. In some embodiments, a user may manually adjust the images to prepare them for performing object recognition, for example by manually removing reflections and other visual artifacts. Thus, receiving the two-dimensional image data may be more labor-intensive than producing the two-dimensional images from the three-dimensional model as described above in connection with block 306. After acquiring the two-dimensional images, the method 300 proceeds to block 310, described below.

In block 310, the server computing device 102 adds the two-dimensional images corresponding to the object to be recognized to the object recognition database 208. As described further below, those two-dimensional images may be used to recognize objects in image data captured by the edge computing devices 104. In block 312, the server computing device 102 determines whether additional objects remain to be added to the object recognition database 208. For example, the server computing device 102 may determine whether images for every product stocked by a retail store (e.g., around 100,000 products) have been included in the object recognition database 208. If additional objects remain, the method 300 loops back to block 302 to add the additional objects. If no additional objects remain, the method 300 advances to block 314.

In block 314, the server computing device 102 identifies the objects from the object recognition database 208 that are expected to be recognized by each of the edge computing devices 104. The server computing device 102 may use any technique to determine the objects that are expected to be recognized by a particular edge computing device 104. For example, the server computing device 102 may identify expected objects based on the expected location and/or expected use of the edge computing device 104. For example, an edge computing device 104 incorporated in or otherwise coupled to a product storage unit may be expected to recognize the objects typically stored in that product storage unit. The server computing device 102 may reference an inventory management system or other database to determine the objects typically stored in that product storage unit. Continuing that example, an edge computing device 104 coupled to a vending machine or cooler may be expected to recognize beverages that may be stocked in the vending machine or cooler (or in the associated store). As another example, an edge computing device 104 coupled to a retail shelf may be expected to recognize retail packaging of the products that should be stocked on that retail shelf. Thus, each reduced object recognition database 212 may include images for a much smaller number of objects than the object recognition database 208 (e.g., around ten products stored on a retail shelf as compared to more than 100,000 products in the retail store).

In block 316, the server computing device 102 generates a reduced object recognition database 212 for each edge computing device 104. Each reduced object recognition database 212 includes two-dimensional images associated a subset of the objects of the object recognition database 208. The images included in a particular reduced object recognition database 212 are the objects that are expected to be recognized by the associated edge computing device 104, determined as described above in connection with block 314. Accordingly, the server computing device 102 may prepare a different reduced object recognition database 212 for each edge computing device 104. In block 318, the server computing device 102 transmits the corresponding reduced object recognition database 212 to each edge computing device 104.

In block 320, the server computing device 102 monitors for thumbnail images received from one or more of the edge computing devices 104. As described further below in connection with FIG. 4, an edge computing device 104 may transmit a thumbnail image to the server computing device 102 if an object is not recognized (e.g., if the object is not included in the reduced object recognition database 212 of the corresponding edge computing device 104). The thumbnail image may be embodied as any image or series of images captured by the edge computing device 104. The thumbnail image may be cropped, reduced in resolution, reduced in framerate, or otherwise modified to reduce the storage space, bandwidth, and/or energy required to transmit the thumbnail image from the edge computing device 104 to the server computing device 102. In block 322, the server computing device 102 checks whether a thumbnail image has been received. If not, the method 300 loops back to block 320 to continue monitoring for thumbnail images. If a thumbnail image has been received, the method 300 advances to block 324.

In block 324, the server computing device 102 recognizes an object based on the thumbnail image received from the edge computing device 104. The server computing device 102 may use any technique to recognize the object. For example, the server computing device 102 may compare the thumbnail image to the two-dimensional images stored in the object recognition database 208 in order to identify a matching object. Because the object recognition database 208 is much larger than the reduced object recognition database 212, object recognition by the server computing device 102 may require much more energy, processing power, storage space, or other computing resources as compared to object recognition by the edge computing device 104. Additionally or alternatively, in some embodiments a user of the server computing device 102 may manually match the thumbnail image to an object (for example, if the object is not initially included in the object recognition database 208).

After recognizing the object, in block 326, the server computing device 102 adds the two-dimensional images associated with the recognized object to an updated reduced object recognition database 212 for the edge computing device 104. In block 328, the server computing device 102 transmits the updated reduced object recognition database 212 to the edge computing device 104. The server computing device 102 may use any technique to generate and/or transmit the updated reduced object recognition database 212. For example, in some embodiments, the server computing device 102 may regenerate the entire reduced object recognition database 212 to include the newly recognized object. As another example, in some embodiments the server computing device 102 may generate and/or transmit only incremental changes to the reduced object recognition database 212. After transmitting the updated reduced object recognition database 212, the method 300 loops back to block 320 to continue monitoring for thumbnail images.

Figure 4:
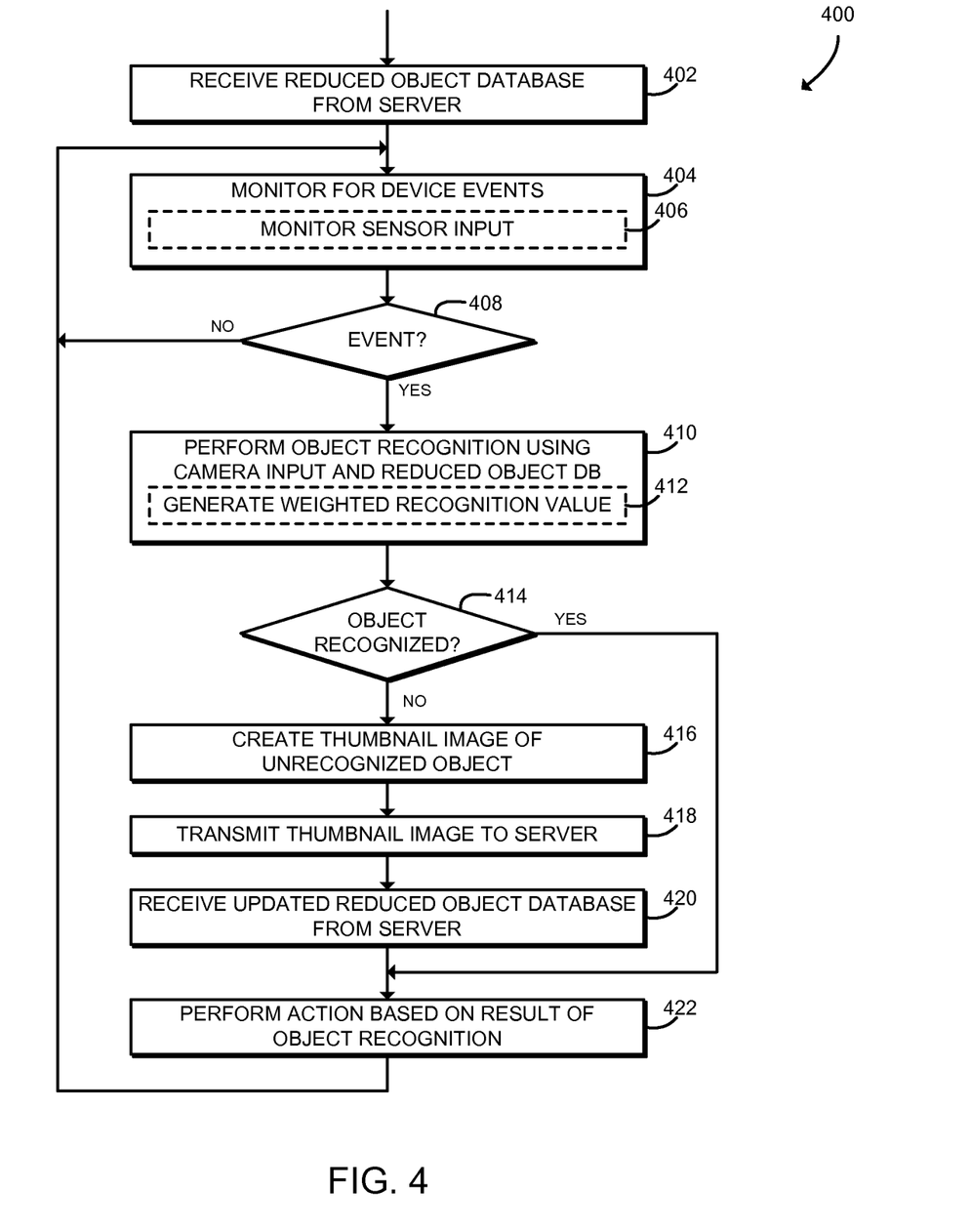
FIG. 4 is a simplified flow diagram of at least one embodiment of a method for edge device object recognition that may be executed by an edge computing device of FIGS. 1 and 2.

Referring now to FIG. 4, in use, an edge computing device 104 may execute a method 400 for edge device object recognition. The method 400 begins with block 402, in which the edge computing device 104 receives a reduced object recognition database 212 from the server computing device 102. As described above in connection with block 316 of FIG. 3, the reduced object recognition database 212 includes two-dimensional images associated with objects that are expected to be recognized by the edge computing device 104. The reduced object recognition database 212 may include image data for a relatively small number of objects (e.g., ten products expected to be stocked on a retail shelf).

In block 404, the edge computing device 104 monitors for one or more device events. The edge computing device 104 may monitor for any appropriate event, such as timer events, software events, network events, sensor events, or any other events or changes to the edge computing device 104. In many embodiments, a device event may indicate that a user is accessing the edge computing device 104, for example by opening an associated product storage unit. As another example, the edge computing device 104 may monitor for product vending events, such as when a user selects an item from a vending machine. The edge computing device 104 may monitor for events in a low-power state such as a sleep state. In some embodiments, in block 406 the edge computing device 104 may monitor sensor input from one or more sensors. For example, the edge computing device 104 may monitor the sensors for door open and/or door close events, such as when a door of a product storage unit is opened and/or closed. Other events may include weight change events, such as when a product is added or removed from a product storage unit, light events such as when a product storage unit is opened and/or when a light is turned on by a user, or other events. In block 408, the edge computing device 104 determines whether a device event has occurred. If not, the method 400 loops back to block 404 to continue monitoring for device events. If a device event has occurred, the method 400 advances to block 410.

In block 410, the edge computing device 104 performs object recognition using image data captured from the camera(s) 150, based on the reduced object recognition database 212. The edge computing device 104 may capture one or more still and/or video images of the object using the camera(s) 150. Further, in some embodiments, the edge computing device 104 may power on or otherwise activate the camera(s) 150 to capture the images and then may power off or otherwise deactivate the camera(s) 150 after capturing the image, which may reduce power consumption. Additionally, in some embodiments the edge computing device 104 may capture two-dimensional or three-dimensional shape data associated with the captured image, for example from one or more three-dimensional or stereo cameras 150, or from one or more three-dimensional scanners (e.g., a laser scanner). The edge computing device 104 may perform object recognition by comparing the captured image data to the two-dimensional images stored in the reduced object recognition database 212 in order to identify a matching object. In some embodiments, the edge computing device 104 may perform object recognition in an asynchronous background process without blocking other functionality of the edge computing device 104. In some embodiments, in block 412, the edge computing device 104 may generate a weighted recognition value for one or more objects. For example, the edge computing device 104 may generate a recognition confidence value associated with one or more objects (e.g., a percent confidence). Of course, in some embodiments, the edge computing device 104 may additionally or alternatively perform binary recognition, for example determining whether an object is or is not recognized.

In block 414, the edge computing device 104 determines whether an object has been recognized. The edge computing device 104 may, for example, compare weighted recognition values to a configurable recognition threshold. As described above in connection with block 412, the edge computing device 104 may generate a partial recognition score. If the partial recognition score is below a recognition threshold (e.g., a threshold percent confidence), the edge computing device 104 may determine that an object has not been recognized. If an object is recognized, the method 400 branches ahead to block 422, described below. If an object is not recognized, the method 400 advances to block 416.

In block 416, the edge computing device 104 creates a thumbnail image of the unrecognized object. As described above, the thumbnail image may be cropped, reduced in resolution, reduced in framerate, or otherwise modified to reduce the storage space, bandwidth, and/or energy required to transmit the thumbnail image from the edge computing device 104 to the server computing device 102. For example, in some embodiments, the edge computing device 104 may create the thumbnail image by selecting a particular part of the image data captured by the camera 150 that includes the unrecognized object.

In block 418, the edge computing device 104 transmits the thumbnail image to the server computing device 102. As described above in connection with blocks 324, 326 of FIG. 3, the server computing device 102 may recognize the object in the thumbnail image and then prepare an updated reduced object recognition database 212 that includes two-dimensional image data for that object. In block 420, the edge computing device 104 receives an updated reduced object recognition database 212 from the server computing device 102. As described above in connection with block 328 of FIG. 3, the reduced object recognition database 212 may be transmitted in any format, including as an entire database or as incremental changes. Thus, after receiving the updated reduced object recognition database 212, the edge computing device 104 may be capable of recognizing the previously unrecognized object.

In block 422, the edge computing device 104 performs one or more actions based on the result of the object recognition. In some embodiments, the edge computing device 104 may log the object recognition results, for example recording the recognized object(s) and/or the associated weighted recognition values. In some embodiments, the edge computing device 104 may provide the results of object recognition to a user or to another device such as an inventory management system. After performing the action based on the result of object recognition, the method 400 loops back to block 404 to continue monitoring for device events.

EXAMPLES

Illustrative examples of the technologies disclosed herein are provided below. An embodiment of the technologies may include any one or more, and any combination of, the examples described below.

Example 1 includes a computing device for edge device object recognition, the computing device comprising object database circuitry to access an object recognition database, wherein the object recognition database includes two-dimensional images associated with a plurality of objects; reduction circuitry to (i) identify a subset of the plurality of objects based on an identity of an edge computing device, wherein each object of the subset of the plurality of objects comprises an object expected to be captured in an image by the edge computing device and (ii) generate a reduced object recognition database based on the object recognition database, wherein the reduced object recognition database includes two-dimensional images associated with the subset of the plurality of objects; and communication circuitry to transmit the reduced object recognition database to the edge computing device.

Example 2 includes the subject matter of Example 1, and wherein the reduction circuitry is further to (i) identify a second subset of the plurality of objects based on an identity of a second edge computing device, wherein each object of the second subset of the plurality of objects comprises an object expected to be captured in an image by the second edge computing device and (ii) generate a second reduced object recognition database based on the object recognition database, wherein the second reduced object recognition database includes two-dimensional images associated with the second subset of the plurality of objects; and the communication circuitry is further to transmit the second reduced object recognition database to the second edge computing device.

Example 3 includes the subject matter of any of Examples 1 and 2, and wherein to identify the subset of the plurality of objects based on the identity of the edge computing device comprises to identify the subset of the plurality of objects based on an expected location of the edge computing device.

Example 4 includes the subject matter of any of Examples 1-3, and wherein to identify the subset of the plurality of objects based on the expected location of the edge computing device comprises to identify an expected retail shelf location of the edge computing device.

Example 5 includes the subject matter of any of Examples 1-4, and wherein to identify the subset of the plurality of objects based on the identity of the edge computing device comprises to identify the subset of the plurality of objects based on an expected use of the edge computing device.

Example 6 includes the subject matter of any of Examples 1-5, and further including modeling circuitry to convert a three-dimensional model of an object into a plurality of two-dimensional images associated with the object; wherein the object database circuitry is further to add the two-dimensional images associated with the object to the object recognition database.

Example 7 includes the subject matter of any of Examples 1-6, and further including object recognition circuitry to identify an object based on a thumbnail image received from the edge computing device using the object recognition database; wherein the reduction circuitry is further to add two-dimensional images associated with the object to an updated reduced object recognition database in response to identification of the object based on the thumbnail image; and wherein the communication circuitry is further to (i) receive the thumbnail image from the edge computing device and (ii) transmit the updated reduced object recognition database to the edge computing device.

Example 8 includes a computing device for edge device object recognition, the computing device comprising communication circuitry to receive a reduced object recognition database from a server computing device, wherein the reduced object recognition database includes two-dimensional images associated with a plurality of objects; event circuitry to monitor for an occurrence of a device event; image capture circuitry to capture image data from a camera of the computing device; and object recognition circuitry to (i) perform object recognition based on the image data with the reduced object recognition database in response to an occurrence of the device event; and (ii) perform an object recognition action in response to performance of the object recognition.

Example 9 includes the subject matter of Example 8, and wherein to monitor for the occurrence of the device event comprises to receive sensor data from one or more sensors of the computing device.

Example 10 includes the subject matter of any of Examples 8 and 9, and wherein the device event comprises a door open event or a door close event.

Example 11 includes the subject matter of any of Examples 8-10, and wherein to capture the image data from the camera comprises to capture the image data from the camera in response to the occurrence of the device event.

Example 12 includes the subject matter of any of Examples 8-11, and wherein to perform the object recognition comprises to generate a weighted recognition value based on the image data.

Example 13 includes the subject matter of any of Examples 8-12, and wherein to perform the object recognition action comprises to log a result of performance of the object recognition based on the image data.

Example 14 includes the subject matter of any of Examples 8-13, and wherein the object recognition circuitry is further to (i) determine whether an object is recognized in response to performance of the object recognition and (ii) generate a thumbnail image of an unrecognized object based on the image data in response to a determination that the object is not recognized; and the communication circuitry is further to transmit the thumbnail image of the unrecognized object to the server computing device.

Example 15 includes the subject matter of any of Examples 8-14, and wherein the communication circuitry is further to receive an updated object recognition database from the server computing device in response to transmission of the thumbnail image, wherein the updated object recognition database includes two-dimensional images associated with the unrecognized object.

Example 16 includes a method for edge device object recognition, the method comprising accessing, by a computing device, an object recognition database, wherein the object recognition database includes two-dimensional images associated with a plurality of objects; identifying, by the computing device, a subset of the plurality of objects based on an identity of an edge computing device, wherein each object of the subset of the plurality of objects comprises an object expected to be captured in an image by the edge computing device; generating, by the computing device, a reduced object recognition database based on the object recognition database, wherein the reduced object recognition database includes two-dimensional images associated with the subset of the plurality of objects; and transmitting, by the computing device, the reduced object recognition database to the edge computing device.

Example 17 includes the subject matter of Example 16, and further including identifying, by the computing device, a second subset of the plurality of objects based on an identity of a second edge computing device, wherein each object of the second subset of the plurality of objects comprises an object expected to be captured in an image by the second edge computing device; generating, by the computing device, a second reduced object recognition database based on the object recognition database, wherein the second reduced object recognition database includes two-dimensional images associated with the second subset of the plurality of objects; and transmitting, by the computing device, the second reduced object recognition database to the second edge computing device.

Example 18 includes the subject matter of any of Examples 16 and 17, and wherein identifying the subset of the plurality of objects based on the identity of the edge computing device comprises identifying the subset of the plurality of objects based on an expected location of the edge computing device.

Example 19 includes the subject matter of any of Examples 16-18, and wherein identifying the subset of the plurality of objects based on the expected location of the edge computing device comprises identifying an expected retail shelf location of the edge computing device.

Example 20 includes the subject matter of any of Examples 16-19, and wherein identifying the subset of the plurality of objects based on the identity of the edge computing device comprises identifying the subset of the plurality of objects based on an expected use of the edge computing device.

Example 21 includes the subject matter of any of Examples 16-20, and further including converting, by the computing device, a three-dimensional model of an object into a plurality of two-dimensional images associated with the object; and adding, by the computing device, the two-dimensional images associated with the object to the object recognition database.

Example 22 includes the subject matter of any of Examples 16-21, and further including receiving, by the computing device, a thumbnail image from the edge computing device; identifying, by the computing device, an object based on the thumbnail image using the object recognition database; adding, by the computing device, two-dimensional images associated with the object to an updated reduced object recognition database in response to identifying the object based on the thumbnail image; and transmitting, by the computing device, the updated reduced object recognition database to the edge computing device.

Example 23 includes a method for edge device object recognition, the method comprising receiving, by a computing device, a reduced object recognition database from a server computing device, wherein the reduced object recognition database includes two-dimensional images associated with a plurality of objects; monitoring, by the computing device, for an occurrence of a device event; capturing, by the computing device, image data from a camera of the computing device; performing, by the computing device, object recognition based on the image data using the reduced object recognition database in response to an occurrence of the device event; and performing, by the computing device, an object recognition action in response to performing the object recognition.

Example 24 includes the subject matter of Example 23, and wherein monitoring for the occurrence of the device event comprises receiving sensor data from one or more sensors of the computing device.

Example 25 includes the subject matter of any of Examples 23 and 24, and wherein the device event comprises a door open event or a door close event.

Example 26 includes the subject matter of any of Examples 23-25, and wherein capturing the image data from the camera comprises capturing the image data from the camera in response to the occurrence of the device event.

Example 27 includes the subject matter of any of Examples 23-26, and wherein performing the object recognition comprises generating a weighted recognition value based on the image data.

Example 28 includes the subject matter of any of Examples 23-27, and wherein performing the object recognition action comprises logging a result of performing the object recognition based on the image data.

Example 29 includes the subject matter of any of Examples 23-28, and further including determining, by the computing device, whether an object is recognized in response to performing the object recognition; generating, by the computing device, a thumbnail image of an unrecognized object based on the image data in response to determining that the object is not recognized; and transmitting, by the computing device, the thumbnail image of the unrecognized object to the server computing device.

Example 30 includes the subject matter of any of Examples 23-29, and further including receiving, by the computing device, an updated object recognition database from the server computing device in response to transmitting the thumbnail image, wherein the updated object recognition database includes two-dimensional images associated with the unrecognized object.

Example 31 includes a computing device comprising a processor; and a memory having stored therein a plurality of instructions that when executed by the processor cause the computing device to perform the method of any of Examples 16-30.

Example 32 includes one or more machine readable storage media comprising a plurality of instructions stored thereon that in response to being executed result in a computing device performing the method of any of Examples 16-30.

Example 33 includes a computing device comprising means for performing the method of any of Examples 16-30.

Example 34 includes a computing device for edge device object recognition, the computing device comprising means for accessing an object recognition database, wherein the object recognition database includes two-dimensional images associated with a plurality of objects; means for identifying a subset of the plurality of objects based on an identity of an edge computing device, wherein each object of the subset of the plurality of objects comprises an object expected to be captured in an image by the edge computing device; means for generating a reduced object recognition database based on the object recognition database, wherein the reduced object recognition database includes two-dimensional images associated with the subset of the plurality of objects; and means for transmitting the reduced object recognition database to the edge computing device.

Example 35 includes the subject matter of Example 34, and further including means for identifying a second subset of the plurality of objects based on an identity of a second edge computing device, wherein each object of the second subset of the plurality of objects comprises an object expected to be captured in an image by the second edge computing device; means for generating a second reduced object recognition database based on the object recognition database, wherein the second reduced object recognition database includes two-dimensional images associated with the second subset of the plurality of objects; and means for transmitting the second reduced object recognition database to the second edge computing device.

Example 36 includes the subject matter of any of Examples 34 and 35, and wherein the means for identifying the subset of the plurality of objects based on the identity of the edge computing device comprises means for identifying the subset of the plurality of objects based on an expected location of the edge computing device.

Example 37 includes the subject matter of any of Examples 34-36, and wherein the means for identifying the subset of the plurality of objects based on the expected location of the edge computing device comprises means for identifying an expected retail shelf location of the edge computing device.

Example 38 includes the subject matter of any of Examples 34-37, and wherein the means for identifying the subset of the plurality of objects based on the identity of the edge computing device comprises means for identifying the subset of the plurality of objects based on an expected use of the edge computing device.

Example 39 includes the subject matter of any of Examples 34-38, and further including means for converting a three-dimensional model of an object into a plurality of two-dimensional images associated with the object; and means for adding the two-dimensional images associated with the object to the object recognition database.

Example 40 includes the subject matter of any of Examples 34-39, and further including means for receiving a thumbnail image from the edge computing device; means for identifying an object based on the thumbnail image using the object recognition database; means for adding two-dimensional images associated with the object to an updated reduced object recognition database in response to identifying the object based on the thumbnail image; and means for transmitting the updated reduced object recognition database to the edge computing device.

Example 41 includes a computing device for edge device object recognition, the computing device comprising means for receiving a reduced object recognition database from a server computing device, wherein the reduced object recognition database includes two-dimensional images associated with a plurality of objects; means for monitoring for an occurrence of a device event; means for capturing image data from a camera of the computing device; means for performing object recognition based on the image data using the reduced object recognition database in response to an occurrence of the device event; and means for performing an object recognition action in response to performing the object recognition.

Example 42 includes the subject matter of Example 41, and wherein the means for monitoring for the occurrence of the device event comprises means for receiving sensor data from one or more sensors of the computing device.

Example 43 includes the subject matter of any of Examples 41 and 42, and wherein the device event comprises a door open event or a door close event.

Example 44 includes the subject matter of any of Examples 41-43, and wherein the means for capturing the image data from the camera comprises means for capturing the image data from the camera in response to the occurrence of the device event.

Example 45 includes the subject matter of any of Examples 41-44, and wherein the means for performing the object recognition comprises means for generating a weighted recognition value based on the image data.

Example 46 includes the subject matter of any of Examples 41-45, and wherein the means for performing the object recognition action comprises means for logging a result of performing the object recognition based on the image data.

Example 47 includes the subject matter of any of Examples 41-46, and further including means for determining whether an object is recognized in response to performing the object recognition; means for generating a thumbnail image of an unrecognized object based on the image data in response to determining that the object is not recognized; and means for transmitting the thumbnail image of the unrecognized object to the server computing device.

Example 48 includes the subject matter of any of Examples 41-47, and further including means for receiving an updated object recognition database from the server computing device in response to transmitting the thumbnail image, wherein the updated object recognition database includes two-dimensional images associated with the unrecognized object.

The invention claimed is:

1. A computing device for edge device object recognition, the computing device comprising:
   object database circuitry to access an object recognition database, wherein the object recognition database includes two-dimensional images associated with a plurality of objects;
   reduction circuitry to (i) identify a subset of the plurality of objects based on an identity of an edge computing device, wherein each object of the subset of the plurality of objects comprises an object associated with the identity of the edge computing device and (ii) generate a reduced object recognition database based on the object recognition database, wherein the reduced object recognition database includes two-dimensional images associated with the subset of the plurality of objects; and
   communication circuitry to transmit the reduced object recognition database to the edge computing device.

2. The computing device of claim 1, wherein:
the reduction circuitry is further to (i) identify a second subset of the plurality of objects based on an identity of a second edge computing device, wherein each object of the second subset of the plurality of objects comprises an object associated with the identity of the second edge computing device and (ii) generate a second reduced object recognition database based on the object recognition database, wherein the second reduced object recognition database includes two-dimensional images associated with the second subset of the plurality of objects; and
the communication circuitry is further to transmit the second reduced object recognition database to the second edge computing device.

3. The computing device of claim 1, wherein to identify the subset of the plurality of objects based on the identity of the edge computing device comprises to identify the subset of the plurality of objects based on a location associated with the edge computing device.

4. The computing device of claim 3, wherein to identify the subset of the plurality of objects based on the location associated with the edge computing device comprises to identify a retail shelf location associated with the edge computing device.

5. The computing device of claim 1, wherein to identify the subset of the plurality of objects based on the identity of the edge computing device comprises to identify the subset of the plurality of objects based on a use associated with the edge computing device.

6. The computing device of claim 1, further comprising:
modeling circuitry to convert a three-dimensional model of an object into a plurality of two-dimensional images associated with the object;
wherein the object database circuitry is further to add the two-dimensional images associated with the object to the object recognition database.

7. The computing device of claim 1, further comprising:
object recognition circuitry to identify an object based on a thumbnail image received from the edge computing device using the object recognition database;
wherein the reduction circuitry is further to add two-dimensional images associated with the object to an updated reduced object recognition database in response to identification of the object based on the thumbnail image; and
wherein the communication circuitry is further to (i) receive the thumbnail image from the edge computing device and (ii) transmit the updated reduced object recognition database to the edge computing device.

8. One or more non-transitory, computer-readable storage media comprising a plurality of instructions that in response to being executed cause a computing device to:
access an object recognition database, wherein the object recognition database includes two-dimensional images associated with a plurality of objects;
identify a subset of the plurality of objects based on an identity of an edge computing device, wherein each object of the subset of the plurality of objects comprises an object associated with the identity of the edge computing device;
generate a reduced object recognition database based on the object recognition database, wherein the reduced object recognition database includes two-dimensional images associated with the subset of the plurality of objects; and
transmit the reduced object recognition database to the edge computing device.

9. The one or more non-transitory, computer-readable storage media of claim 8, further comprising a plurality of instructions that in response to being executed cause the computing device to:
identify a second subset of the plurality of objects based on an identity of a second edge computing device, wherein each object of the second subset of the plurality of objects comprises an object associated with the identity of the second edge computing device;
generate a second reduced object recognition database based on the object recognition database, wherein the second reduced object recognition database includes two-dimensional images associated with the second subset of the plurality of objects; and
transmit the second reduced object recognition database to the second edge computing device.

10. The one or more non-transitory, computer-readable storage media of claim 8, wherein to identify the subset of the plurality of objects based on the identity of the edge computing device comprises to identify the subset of the plurality of objects based on a location associated with the edge computing device.

11. The one or more non-transitory, computer-readable storage media of claim 8, further comprising a plurality of instructions that in response to being executed cause the computing device to:
convert a three-dimensional model of an object into a plurality of two-dimensional images associated with the object; and
add the two-dimensional images associated with the object to the object recognition database.

12. The one or more non-transitory, computer-readable storage media of claim 8, further comprising a plurality of instructions that in response to being executed cause the computing device to:
receive a thumbnail image from the edge computing device;
identify an object based on the thumbnail image using the object recognition database;
add two-dimensional images associated with the object to an updated reduced object recognition database in response to identifying the object based on the thumbnail image; and
transmit the updated reduced object recognition database to the edge computing device.

13. A method for edge device object recognition, the method comprising:
accessing, by a computing device, an object recognition database, wherein the object recognition database includes two-dimensional images associated with a plurality of objects;
identifying, by the computing device, a subset of the plurality of objects based on an identity of an edge computing device, wherein each object of the subset of the plurality of objects comprises an object associated with the identity of the edge computing device;
generating, by the computing device, a reduced object recognition database based on the object recognition database, wherein the reduced object recognition database includes two-dimensional images associated with the subset of the plurality of objects; and
transmitting, by the computing device, the reduced object recognition database to the edge computing device.

14. The method of claim 13, further comprising:
identifying, by the computing device, a second subset of the plurality of objects based on an identity of a second edge computing device, wherein each object of the second subset of the plurality of objects comprises an object associated with the identity of the second edge computing device;
generating, by the computing device, a second reduced object recognition database based on the object recognition database, wherein the second reduced object recognition database includes two-dimensional images associated with the second subset of the plurality of objects; and
transmitting, by the computing device, the second reduced object recognition database to the second edge computing device.

15. The method of claim 13, wherein identifying the subset of the plurality of objects based on the identity of the edge computing device comprises identifying the subset of the plurality of objects based on a location associated with the edge computing device.

16. The method of claim 15, wherein identifying the subset of the plurality of objects based on the location associated with the edge computing device comprises identifying a retail shelf location associated with the edge computing device.

17. The method of claim 13, wherein identifying the subset of the plurality of objects based on the identity of the edge computing device comprises identifying the subset of the plurality of objects based on a use associated with the edge computing device.

18. The method of claim 13, further comprising:
converting, by the computing device, a three-dimensional model of an object into a plurality of two-dimensional images associated with the object; and
adding, by the computing device, the two-dimensional images associated with the object to the object recognition database.

19. The method of claim 13, further comprising:
receiving, by the computing device, a thumbnail image from the edge computing device;
identifying, by the computing device, an object based on the thumbnail image using the object recognition database;
adding, by the computing device, two-dimensional images associated with the object to an updated reduced object recognition database in response to identifying the object based on the thumbnail image; and
transmitting, by the computing device, the updated reduced object recognition database to the edge computing device.

* * * * *